United States Patent
Wang

(10) Patent No.: US 10,848,243 B2
(45) Date of Patent: *Nov. 24, 2020

(54) STIMULATED BRILLOUIN SCATTERING (SBS) SUPPRESSION IN AN OPTICAL COMMUNICATIONS SYSTEM

(71) Applicant: ARRIS Enterprises LLC, Suwanee, GA (US)

(72) Inventor: Jun Wang, Warrington, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,702

(22) Filed: Nov. 1, 2019

(65) Prior Publication Data
US 2020/0067597 A1    Feb. 27, 2020

Related U.S. Application Data

(62) Division of application No. 15/789,205, filed on Oct. 20, 2017, now Pat. No. 10,498,448.

(51) Int. Cl.
*H04B 10/54* (2013.01)
*H04B 10/2537* (2013.01)
(Continued)

(52) U.S. Cl.
CPC ... *H04B 10/2537* (2013.01); *H04B 10/25751* (2013.01); *H04B 10/25891* (2020.05); *H04B 10/54* (2013.01); *H04B 10/5563* (2013.01)

(58) Field of Classification Search
CPC combination set(s) only.
See application file for complete search history.

(56) References Cited

U.S. PATENT DOCUMENTS

| 5,042,086 A | * | 8/1991 | Cole | G01S 7/003 398/141 |
| 6,850,712 B1 | * | 2/2005 | Delavaux | H04B 10/2537 398/183 |

(Continued)

*Primary Examiner* — Omar S Ismail
(74) *Attorney, Agent, or Firm* — Chernoff, Vilhauer, McClung & Stenzel, LLP

(57) ABSTRACT

Techniques for transmitting an optical signal through optical fiber with an improved cost effective stimulated Brillouin scattering (SBS) suppression include externally modulating a light beam emitted from a light source with a high frequency signal. The light beam is also modulated externally with an RF information-carrying signal. The high frequency signals are at least twice a highest frequency of the RF signal. The high frequency signals modulating the light source can be gain and phase adjusted by the first set of gain and phase control circuit to achieve a targeted spectrum shape. The adjusted high frequency signals then are split, providing a portion of the split signals to modulate the light source and another portion of the split signals to the second set of phase and gain control circuit for adjusting a phase/gain. The output of second set of phase and gain control circuits can be applied to the external modulator to eliminate intensity modulation caused by the corresponding high frequency signals that modulate the light source. The spread spectrum for SBS suppression or the optical transmitter's SNR is further improved by cancelling a beat between SBS suppression modulation tones and out of band distortion spectrum of information bearing RF signal.

28 Claims, 8 Drawing Sheets

(51) Int. Cl.
*H04B 10/2575* (2013.01)
*H04B 10/556* (2013.01)
*H04B 10/25* (2013.01)

(56) References Cited

U.S. PATENT DOCUMENTS

| | | | | |
|---|---|---|---|---|
| 2004/0105470 | A1* | 6/2004 | Bond | H04B 10/564 372/26 |
| 2011/0150484 | A1* | 6/2011 | Wang | H04B 10/505 398/115 |
| 2011/0261845 | A1* | 10/2011 | Ishaug | H04B 10/2537 372/38.02 |
| 2012/0163833 | A1* | 6/2012 | Wang | H04B 10/5057 398/194 |
| 2014/0059638 | A1* | 2/2014 | Ereifej | H04N 21/61 725/149 |
| 2016/0248223 | A1* | 8/2016 | Blauvelt | H01S 5/5027 |
| 2016/0308664 | A1* | 10/2016 | Ishaug | H04B 10/2537 |

\* cited by examiner

STIMULATED BRILLOUIN SCATTERING (SBS) SUPPRESSION IN AN OPTICAL COMMUNICATIONS SYSTEM

The present application is a division of, and claims priority to U.S. Pat. No. 10,498,448 filed on Oct. 20, 2017 and issued on Dec. 3, 2019, which is hereby incorporated by reference.

BACKGROUND

Optical communications systems utilize modulated light, i.e., optical signals, through light channels or fiber optic cables to transmit information between devices. For example, transmission of broadband signal content, such as analog multichannel video, may include the use of narrow line width light sources in conjunction with low loss, single mode optical fibers (SMF). In optical communication systems, a light beam is modulated in accordance with the information to be conveyed and transmitted along the optical fiber to a receiver.

Long distance transmissions in optical fiber or in the passive optical network where a power split is necessary, especially for CATV applications, may require high fiber launch power for better performance, such as, to achieve a required/desired signal to noise ratio. However, if the optical power input to a fiber in the optical communication system is too high, a phenomenon known as Stimulated Brillouin Scattering (SBS) may occur. With SBS, a portion of the light input to the fiber is reflected and the power level of the light transmitted through the fiber is reduced below the intended power level, among other deleterious effects. SBS can reduce the quality of the signal output from the fiber in the form of, such as, noise rise and thereby affect the performance of a communication system.

Fiber nonlinearities limit a maximum power that may be launched into an optical fiber. Fiber nonlinearities represent the fundamental limiting mechanisms to the amount of data that can be transmitted on a single optic fiber. For a single wavelength system, stimulated Brillouin scattering (SBS) puts a limit to the maximum launch power in many communication applications before the impact of other fiber nonlinearities become relevant.

A common scenario in which SBS occurs is when an optical beam of narrow optical spectrum is launched into an optical fiber with a power above a threshold power level. If the power within the SBS gain line width is kept below a SBS threshold power level, the SBS should remain adequately suppressed. Unfortunately, the SBS threshold power level is either too low for current applications or too low for evolving optical communications systems that would benefit from higher launch power in to the optical fiber. For instance, for standard single mode fiber (SMF) is typically in a range of only about 6-7 dBm (4-5 mW) depending on the fiber length. Prior attempts to increase the SBS threshold have resulted in some system degradations that continue to limit the launch power or may incur some additional costs or some limit in SBS suppression.

Thus, techniques are desirable for raising the SBS threshold, e.g., above 6-7 dBm (4-5 mW), so that launch power in to an optical fiber can be successfully increased is desirable in many applications.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

Figure 1:
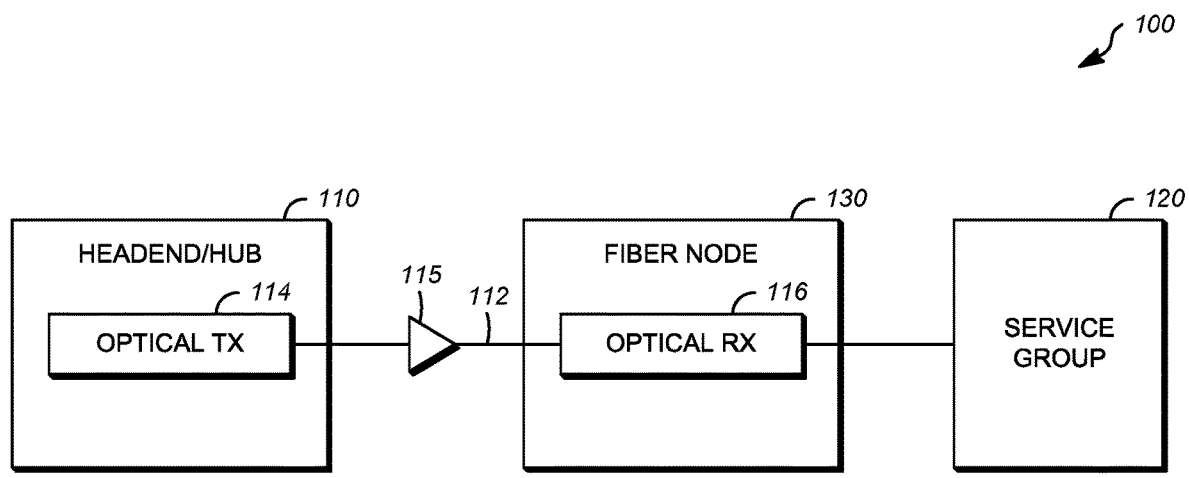
FIG. 1 illustrates an example optical communication system operable to deliver analog and/or high-definition digital entertainment and telecommunications.

It is noted that while the accompanying FIGs. serve to illustrate embodiments of concepts that include the claimed invention, and explain various principles and advantages of those embodiments, the concepts displayed are not necessary to understand the embodiments of the present invention, as the details depicted in the FIGs. would be readily apparent to those of ordinary skill in the art having the benefit of the description herein.

SUMMARY

The present disclosure provides a method for stimulated Brillouin scattering suppression in an optical transmission system, the method comprising generating two or more high frequency dithering signals, each having a frequency at least twice a highest information bearing modulation frequency. The gain and phase of each of the two or more dithering signals may be adjusted at a first set of gain and phase control circuits, and then each of the two or more adjusted dithering signals may be split at an output of the first set of gain and phase adjustment circuits, each of the two or more adjusted dithering signals split into at least a first portion and a second portion. A light source may be directly modulated with combined first portions of split the high frequency signals. Each of the second portions of the high frequency signals may be adjusted by a second set of phase and gain adjustment circuit. A light beam may be emitted from the light source while directly modulating said light source with the combined first portions of the high frequency signals. Further, the light beam emitted from the light source may be externally intensity modulated with both gain and phase adjusted second portions of the high frequency signals and with a radio frequency (RF) information carrying signal. The light beam modulated with the RF information-carrying signal may be coupled onto an optical fiber.

The present disclosure also provides an apparatus for stimulated Brillouin scattering suppression in an optical transmission system comprising one or more processors configured to perform the techniques disclosed herein.

DETAILED DESCRIPTION

Disclosed herein are techniques for suppressing stimulated Brillouin scattering (SBS) in an optical communication system. As described in more detail below, the techniques include suppressing SBS using a direct dithering and externally modulated approach. In embodiments, the disclosed techniques spread optical power of the light beam in a wider optical spectral range, thereby suppressing SBS. In embodiments, a symmetry of the optical spectrum is recoverable for improving SBS suppression. As disclosed in more detail below, embodiments are described that increase a SBS threshold by applying at least two dither tones, thereby successfully increasing an amount of power that may be launched in to an optical fiber.

In an optical communication system, information is transmitted via message signals through a physical medium from a source to a destination. For example, a cable-based system can be used to deliver analog and/or high-definition digital entertainment and telecommunications such as video, voice, and high-speed Internet services from a headend to subscribers over an existing cable television network using optical signals. Such cable television network can take the form of an all-coax, all-fiber, or hybrid fiber/coax (HFC) network. In an HFC optical communication system, for example, an optical transmitter in a headend/hub converts electrical signals (e.g., data, video, and voice signals) to optical signals. The optical signals are transmitted downstream via a fiber to a fiber node that serves a group of end users (i.e., a service group). The fiber node can include an optical receiver that converts the received optical signals to electrical signals that then are transmitted to the service group, for example, via receiving devices such as cable modems (CMs) and/or set top boxes (STBs).

FIG. 1 illustrates an example optical communication system 100 operable to deliver analog and/or high-definition digital entertainment and telecommunications such as video, voice, and high-speed Internet services over a fiber 112 between a headend/hub 110 and fiber node 130 for delivery to a service group 120 of receiving devices such as cable modems (CMs) and/or set top boxes (STBs). An optical transmitter 114 in the headend/hub 110 may convert electrical signals representing various services (e.g., video, voice, and Internet) to optical signals for transmission over the fiber 112 to the fiber node 130. The optical signal from the transmitter 114 may be amplified by an optical amplifier 115 (e.g., an erbium doped fiber amplifier (EDFA)) before reaching the fiber node 130. An example EDFA 115 is shown between headend/hub 110 and the fiber node 130, but it is noted that the EDFA 115 may be located in the headend/hub 110 and/or in the fiber node 130 or along the fiber.

A single fiber node 130 is shown in FIG. 1, but it should be understood that a network of nodes may exist between the headend/hub 110 and the service group 120 for delivery of cable services to consumers, and networks may be designed with fiber, coax, or a combination thereof for transmission of optical and/or electrical signals. In the example system shown in FIG. 1, the fiber node 130 includes an optical receiver 116 that converts the received optical signals to electrical signals. The electrical signals then are transmitted to service group 120.

Brillouin scattering is an interaction of light photons with acoustic or vibrational quanta (phonons) that occurs when light in a medium (e.g., air, water, crystal) interacts with time-dependent optical density variations and changes its energy (frequency) and path. The interaction consists of an inelastic scattering process in which a photon is either created (Stokes process) or annihilated (anti-Stokes process). The energy of the scattered light is slightly changed, that is, the energy is decreased for a Stokes process and increased for an anti-Stokes process. The shift in energy, known as the Brillouin shift, is equal to the energy of the interaction.

For intense beams (e.g., laser light) traveling in an optical communications system through a medium, such as optical fiber 112 shown in FIG. 1, the variations in the electric field of the beam itself may produce acoustic vibrations in the medium via electrostriction. The beam may undergo Brillouin scattering from these vibrations, usually in opposite direction to the incoming beam. For example, an incident wave may propagate from the headend 110 to a fiber node 130 along the optical fiber 11, which may have a very small core diameter. When large amounts of light are launched in to the optical fiber 112 by the optical transmitter 114, the incident wave coming from the optical amplifier 115 may exceed a threshold power, exciting an acoustic wave within the fiber 112. A resulting fluctuation in the refractive index from the acoustic wave creates a reflected wave that propagates in a direction opposite to the incident wave. The incident beam undergoes Brillouin scattering from the vibrations, a phenomenon known as stimulated Brillouin scattering (SBS). Brillouin scattering may also reduce the quality of the signal received at the fiber node 130 and thereby degrade the performance of the optical communications system 100.

Stimulated Brillouin scattering is frequently encountered when narrow-band optical signals (e.g., from a single-frequency laser) are amplified in an optical amplifier. It is well known that the amount of light, or the available power, that can be injected into a single-mode fiber is limited by SBS. With SBS, a portion of incident light is reflected back along the input path. The SBS can be thought of as a result of an overflow of light in to the optical fiber. Therefore, it is important to accommodate for the SBS threshold when designing an optical transmission system. For example, in applications such as radio frequency over glass (RFoG) applications, it may be desirable to successfully launch more light in to the optical communications system than is achievable by currently available techniques. This is especially true for analog transmission systems for hybrid fiber-coax (HFC) networks and passive optical networks (PON) in which high fiber launch power enables the high signal to noise ratio requirement to be achieved and permits higher split numbers along the transmission line.

It is desirable to mitigate the amount of SBS in an optical fiber, maximize the use of light, and/or identify how much light an optical fiber can manage. In particular, the transmission quality of optical signals having relatively high intensity and narrow line width may be improved by reducing the effects of SBS, allowing an increase in an optical signal power level and an increase in a propagation distance between communication links, and accomplishing this is desirable without generating additional system degradation.

In the example optical communications system shown in FIG. 1, the output of the optical transmitter 114 is shown connected to an optical amplifier 115. An optical amplifier is a device that amplifies an optical signal directly, without the need to first convert the signal to an electrical signal. A doped fiber amplifier (DFAs) is an example optical amplifier that uses a doped optical fiber as a gain medium to amplify an optical signal. In particular, the signal input to be amplified and a pump laser are multiplexed into the doped fiber and the signal is amplified through interaction with the doping ions.

The success of optical amplifiers, such as erbium doped fiber amplifiers (EDFA) and semiconductor optical amplifiers (SOA), has essentially eliminated high transmitter output power or high fiber launch power as a problem in most optical fiber communication applications. This is because these amplifiers permit efficient amplification at saturated output powers. For example, the amplifiers may perform efficient amplification of signals at optical carriers around 1550 nm up to saturated output powers exceeding 23 dBm (200 mW). The use of such an amplifier also enables longer reach fiber links and the ability to optically split the signal to serve multiple users.

However, as described above, despite the use of such optical amplifiers and the abilities to increase launch power in to the fiber, fiber nonlinearities nevertheless limit maximum launch power into optical fiber. In particular, for a single wavelength system, stimulated Brillouin scattering (SBS) puts a limit to maximum launch power in many communication applications before the impact of other fiber nonlinearities becomes relevant. Because SBS occurs when an optical beam is launched into an optical fiber with a power above a threshold power level, SBS should remain adequately suppressed as long as the power within the SBS gain line width does not exceed the SBS threshold power level. Wavelength (the threshold is lower at 1550 nm than 1310 nm) and the linewidth of the transmitter, among other parameters, govern the precise threshold for the onset of the SBS effect. Unfortunately, the SBS threshold power level is still a limiting factor. For instance, for standard SMF the SBS threshold power is typically in a range of only about 6-7 dBm (4-5 mW). Thus, raising the SBS threshold above 6-7 dBm (4-5 mW) so that launch power can be increased is desirable in many applications.

SBS affects optical transmission systems within an optical channel but normally do not cause crosstalk between multiple optical channels because of its narrow gain spectral width. However, because of its narrow bandwidth nature, SBS is particularly detrimental to optical transmission systems having modulation schemes which generate narrow optical spectrum where most of the optical power centers in a small frequency range near the optical carrier. As an example, the modulation schemes of CATV/HFC systems are typically amplitude modulation with vestigial sideband (AMVSB) whose root mean square (RMS) modulation index is about 20% to 30% without laser clipping. Therefore, most of the energy centers are within a small bandwidth around the optical carrier. Thus, SBS impacts CATV/HFC systems on carrier to noise ratios (CNR) and distortions, especially second order distortion, CSO.

In CATV/HFC systems, for an externally modulated transmitter one way to broaden the linewidth involves adding a modulation signal (dither signal) to the DC current source used drive to source laser. This broadens the spectral linewidth of the transmitter and increases the threshold for the onset of SBS.

SBS affects the externally modulated analog systems much more than directly modulated analog systems if proper SBS suppression mechanisms are not implemented. The first reason for this is that an external modulator exhibits almost zero modulator chirp, and thus, the power is densely centered closely around the optical carrier. The second reason is that external modulators are used for longer reach because of their low chirp, and long reach requires more launch power.

On the other hand, in directly modulated analog systems, a broadened optical spectrum due to a relatively larger laser chirp may be less affected by SBS, thus allowing more optical input power to the fiber. Such a directly modulated transmitter puts out optical power with such a large linewidth that it is significantly greater than the SBS gain bandwidth and therefore a directly modulated transmitter is not very susceptible to SBS. Nonetheless, the wide spread of the spectrum lowers a power per unit spectral width, and laser chirp together with fiber dispersion restricts link length due to performance degradation. A system with a directly modulated transmitter is susceptible to fiber dispersion such that distortions are caused when the signal is carried over a non-zero dispersion wavelength of the fiber.

In view of the foregoing, the directly modulated analog systems are usually used for shorter reach with a relatively lower launch power, and, therefore, the analog transmission systems of directly modulated lasers are typically less susceptible to SBS. However, such directly modulated analog systems may have a very high output power when used with high split ratios (one transmitter serving many nodes), where high power can generate more chirp to widen the line-width using a high power laser (thereby helping SBS suppression).

As discussed above, manners for mitigating the effects of SBS with an external modulator include using also phase modulation, increasing the linewidth of the source, and limiting the power per channel or per peak in the transmitter output spectrum to less than the SBS threshold. In general, SBS impact can be reduced in an externally modulated analog system if the optical signal's spectrum can be broadened since the energy per bandwidth or per spectral peak is lowered. The most effective and widely used techniques for combating SBS include the use of an optical phase modulator or dithering the laser or the combination of both, in the case of external modulators.

Using phase modulation may add significant cost and optical loss and also may not be practical based on the transport technology used. Increasing the spectral width of the source increases SBS threshold. In an example, a wavelength of light is divided in to multiple smaller wavelengths, each less than a Brillouin scattering threshold, for inputting to the optical fiber. For example, if the wavelength of light is divided in to two smaller wavelengths less than a 7 dBm Brillouin threshold, and the two wavelengths are input in to the optical fiber, the SBS limit of that transmitter is effectively increased by 3 db. The extension of the SBS limit achieved by such attempts has been limited, whereby current approaches have been unable to extend the limit past higher power, such as 16-18 dBm for nominal links.

Dithering a laser directly is an approach for SBS suppression that may be more cost effective because it does not require an optical phase modulator. Thus, dithering without an optical phase modulator may be achieved as disclosed herein. In one or more embodiments, dithering can be done with high frequency or low frequency, the high frequency implementation using a dither frequency that is at least twice the highest signal frequency, the low frequency implementation using a frequency that is lower than the lowest signal frequency. The laser may be dithered by applying a low frequency sine wave either to the resistive heater in the phase control section or to the laser's active section directly. The laser may also be dithered by applying a high frequency sine wave, whose frequency is at least twice of the highest signal frequency, to the laser's bias current. For example, a low frequency may dither a laser thermally by applying a low frequency wave, such as either through a thermoelectric controller (TEC) or to the laser's active section directly. Bias current may also be dithered by applying a high frequency sine wave, whose frequency is at least twice of the highest signal frequency, to the laser's active section directly. If a desired launch power target is attainable using direct dithering, it is a desirable SBS suppression approach.

Figure 2:
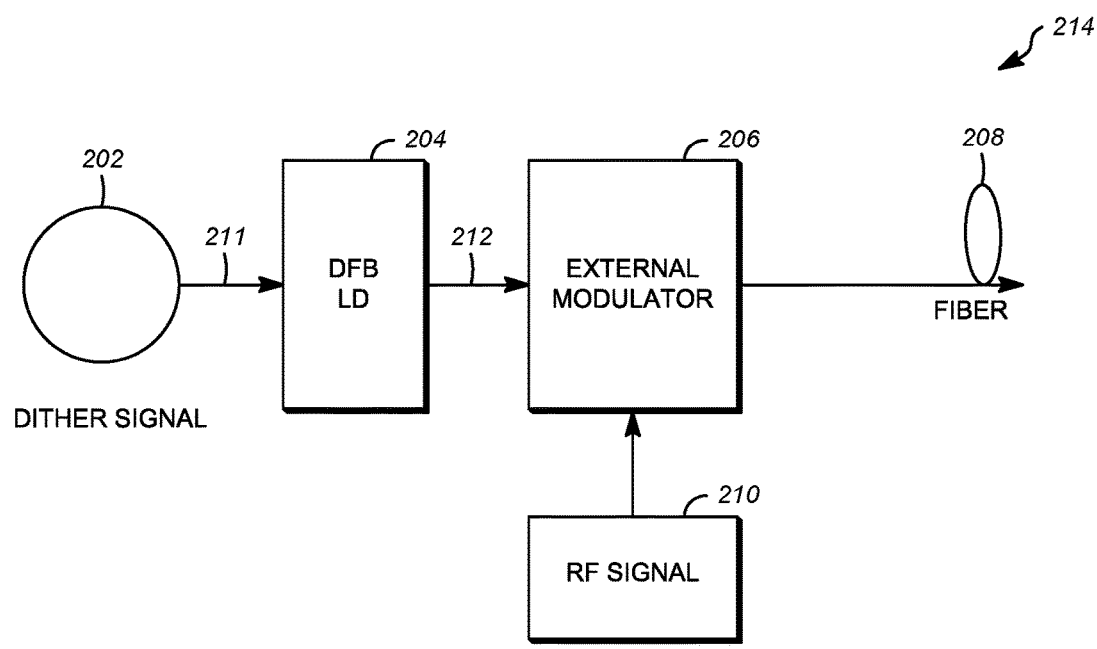
FIG. 2 is a block diagram of a modulator portion of an optical transmitter having a DFB laser and an external modulator, in which SBS suppression dither and dither signal generation circuit are included.

FIG. 2 illustrates an optical fiber transmission system having an embodiment of an optical transmitter 214 with an external modulator 202 for providing suppressed stimulated Brillouin scattering (SBS). The optical transmitter 214 in FIG. 2 includes a light source 204, such as a laser diode, for emitting a light beam 212, a signal generator 202 for dithering the laser 204, and an intensity modulator 206 externally coupled to the light source 204. The intensity modulator 206 receives the light beam 212 and modulates the light beam 212 with an RF information-carrying signal 210, e.g., a cable television RF signal. The signal generator 202 is connected to the light source 204 for driving the light source 204 with a high frequency dithering signal 211. The external modulator 206 may be any suitable modulator for externally modulating the light beam, such as Mach Zenhder (MZ) modulator, electro-absorption (EA) modulator, or the like.

In optical communications, intensity modulation (IM) is a form of modulation in which the optical power output of a source is varied in accordance with some characteristic of the modulating signal. The envelope of the intensity modulated optical signal is an analog of the modulating signal in the sense that the instantaneous power of the envelope is an analog of the characteristic of interest in the modulating signal. The instantaneous power deviation of the IM modulated signal is, to a first approximation, proportional to the momentary amplitude of a modulating signal, where deviation means the deviation from a mean power.

For comparison, it is noted that with analog modulation, the modulator produces optic power variations as a voltage waveform, the simplest type of analog modulation including transmission of a single sinusoidal current variation, i.e., an optic baseband transmission in which the signal is carried on a light beam modulated at baseband frequencies of information. Frequency modulation refers to the encoding of information in a carrier wave by varying the instantaneous frequency of the wave. By comparison, in amplitude modulation the amplitude of the carrier wave varies while the carrier frequency remains constant.

It is noted that in direct dithering approaches, due to the simultaneous intensity modulation (IM) and frequency modulation (FM) or chirp, the spread optical spectrum loses its symmetry as compared to a pure FM spectrum. This leads to an enhanced spectral component on one side of original optical carrier because of the summation of the FM and IM spectral components, and a suppressed spectral components on the other side because of subtraction of the FM and IM spectral components, leading to an asymmetry of the optical spectrum around the optical carrier. As discussed above, for a fixed SBS threshold per spectrum of a fiber, the highest optical spectrum component decides the maximum allowed fiber launch power in the asymmetrical optical spectrum. This limitation may be reduced by increasing the dithering amplitude to get the optical spectrum further spread. However, a very wide spread spectrum when interacting with fiber dispersion causes some system performance degradations, such as, modulation response roll-off. The reason for roll-off is that the fiber dispersion introduces different delay time for different optical spectrum. The different delay time makes more phase change at higher signal frequencies. At the receiver, when all optical spectral components are summated, higher signal frequencies experience more phase deviation between different optical spectral components, each carrying information bearing modulation, and therefore causes transmitter response roll-off. Thus, where frequency stays the same, the delay difference may cause a phase difference.

In accordance with the above, while the optical power is intensity modulated, the optical field intensity is proportional to the field amplitude squared and is both amplitude modulated and frequency modulated (FM). In other words, due to the simultaneous intensity modulation (IM) and frequency modulation (FM), the optical electromagnetic field put out by the transmitter is amplitude modulated (AM) and FM modulated, where pure FM modulated is desired to obtain a symmetric spectrum. As shown by equations (1) and (11) below, the relationship between FM, and AM is illustrated. The laser AM and FM happen simultaneously due to the nature of the laser, even if only the AM modulation is targeted.

A way to limit the response roll-off is to confine the dithered optical spectrum within the narrowest window possible while the targeted SBS suppression is achieved. It is not hard to understand that if the dithered spectrum components can be composed of several equally spaced and the same amplitude discrete spectral lines the SBS suppression can be primarily achieved by the fixed number of optical spectral lines while the spectrum width is also limited to a narrow spectrum span. For example, if the number of spectral lines can be changed to 9 after dithering from 1 then the new SBS threshold becomes 10 log(9)+6 dBm=15.5 dBm. If the number of spectral lines can be changed to 11 from 1 then the new SBS threshold becomes 16.4 dBm. That is to say, a flat top rectangular spectrum spread is ideal to efficiently suppress SBS while keeping the spectrum spread to minimum to control the modulation response roll-off. Besides, in most DWDM applications, a confined optical spectrum spread also reduces the change of channel to channel interference due to fiber nonlinearities, such as four wave mixing. Apparently, a symmetrical spectrum is a prerequisite to produce a flat top rectangular spectrum.

Disclosed herein are techniques for optimizing SBS suppression using two dither tones for the externally modulated transmitters. The method allows significantly improved SBS suppression using the direct dithering method. As described in more detail below, embodiments are disclosed in which a light beam emitted from a light source may be modulated with two or multiple high frequency dithering signals. After being emitted by the light source, which may be dithered by dithering signals, the light beam may be further intensity modulated externally with an RF information-carrying signal. In embodiments, the high frequency dithering signals are at least twice a highest frequency of the RF information-carrying signal. The light beam which is intensity-modulated with the RF information-carrying signal may be thereafter coupled into optical fiber. In embodiments, the high frequency dithering signals spread the optical power of the light beam in a wider optical spectral range, thereby suppressing SBS.

Traditionally, a single high frequency dither-tone is used for directly modulating the laser diode as shown in FIG. 2. However there is a limitation for SBS suppression using this dithering method because simultaneous IM and FM modulation can cause asymmetrical spectrum due to the summation of IM and FM spectral components.

The mathematics of the asymmetrical optical spectrum of an intensity modulated laser diode in the case of single dither tone may be described by its amplitude of the electrical field as follows:

$$E=[P_0(1+m_d \cos(\omega_d t))]^{0.5} \exp[j\omega_0 t + m_{fm} \sin(\omega_d t)] \quad (1)$$

Where:

$P_0$ is the power of the laser output light;
$m_d$ the optical modulation index of the dithering signal;
$\omega_d$ is the frequency of the dithering signal;
$\omega_0$ is the frequency of optical carrier; and
$m_{fm}$ is the frequency modulation index due to the laser chirp.

Equation (1) demonstrates that optical frequency is decided by two parts, the first part is caused by intensity modulation and is described by:

$$[P_0(1+m_d \cos(\omega_d t))]^{0.5} \quad (2)$$

The normalized Fourier series expansion of equation (2) is:

$$[(1+m_d\cos(\omega_d t))]^{0.5} = A_0 + \sum_{n=1}^{\infty} A_n \cos(n\omega_d t) \quad (3)$$

Where:

$$A_0 = \frac{1}{T}\int_0^T [(1+m_d\cos(\omega_d t))]^{0.5} dt \quad (4)$$

$$A_n = \frac{1}{T}\int_0^T [(1+m_d\cos(\omega_d t))]^{0.5} \cos(n\omega_d t) dt \quad (5)$$

The FM modulation portion of the spectrum can be expressed as $$\exp[j\omega_0 t + m_{fm} \sin(\omega_d t)] \quad (6)$$

The Fourier series expansion of equation (6) is:

$$\exp[j\omega_0 t + m_{fm}\sin(\omega_d t)] = J_0(m_{fm})\exp(j\omega_0 t) + \sum_{n=1}^{\infty} J_n(m_{fm})[\exp(j(\omega_0+n\omega_d)t)+(-1)^n\exp(j(\omega_0-n\omega_d)t)] \quad (7)$$

Where $J_n$ is the Bessel function of the first kind at $n$th order.

The optical spectrum is thus decided by the product of equations (3) and (7) as:

$$E = P_0^{0.5}\left[B_0\exp(j\omega_0 t) + \sum_{n=1}^{\infty} B_{nH}\exp(j(\omega_0+n\omega_d)t) + \sum_{n=1}^{\infty} B_{nL}\exp(j(\omega_0-n\omega_d)t)\right] \quad (8)$$

Where:

$$B_0 = \sum_{k=0}^{\infty} A_{2k} J_{2k} \quad (9)$$

$B_{nH}$ represents the amplitude of upper sideband optical spectral components, calculated as:

$$B_{nH} = 0.5(A_0 J_n + A_n J_0) + 0.5\sum_{k=1}^{\infty} J_k(A_{|n-k|}+(-1)^n A_{n+k}) \quad (10)$$

$B_{nL}$ represents the amplitude of lower sideband optical spectral components, calculated as:

$$B_{nL} = 0.5((-1)^n A_0 J_n + A_n J_0) + 0.5\sum_{k=1}^{\infty} J_k(A_{n+k}+(-1)^n A_{|n-k|}) \quad (11)$$

Figure 3:
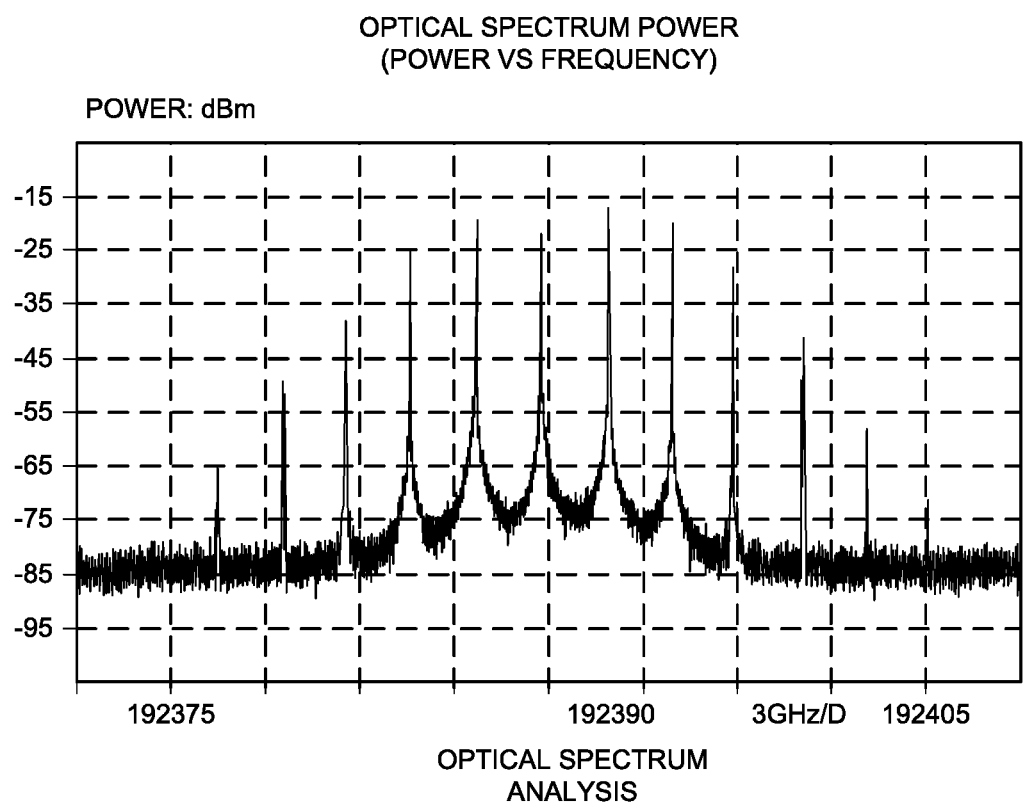
FIG. 3 is an example of the optical spectrum before dither IM is cancelled, illustrating the spectral asymmetry.

FIG. 3 shows an optical spectrum that was measured from a laser directly dithered by a signal tone, where such SBS suppression relies on spectrum spread. The asymetry of the spectrum shown in FIG. 3 may result from FM and IM.

The power of each spectrum component shown in FIG. 3 is the spectrum of an optical spectrum analyzer whose input optical power is attenuated before input to the analyzer. It is noticed that the highest spectrum determines the SBS suppression level. If the power is not attenuated, the spectrum component power may reflect the real power. In that case, if the largest component's power is below 6 dBm then SBS won't happen. The spectrum therefore reflects the spectrum of relative power but power relationship is still true. In another word, the highest optical spectrum component should be below 6 dBm and not cause an SBS impact.

As illustrated in FIG. 3, the use of a single tone results in limited SBS suppression because the spectrum spread remains small. Increasing the dither of the laser may result in a further spread of the optical spectrum, but with the wider spread comes an increase in roll-off as the signal (light) reaches the end of the fiber. Thus, if the total input power is high, the highest spectrum component may be above the SBS threshold. It is noted that the input power to the spectrum analyzer in FIG. 3 is attenuated.

As mentioned above, to suppress higher SBS, a higher dithering amplitude is needed, which causes higher undesirable IM modulation and, in turn, makes the spectrum asymmetry more pronounced and further results in additional modulation response roll-off. As can be determined from the math analysis, it is hard to achieve a flat-top rectangular spectrum with a single tone FM modulation (chirp only) even with a symmetrical spectrum for a significant SBS suppression.

Disclosed herein are the use of multiple dither tones are proposed here to dither the laser. The use of such multiple dither tones may confine spectral components closer while still achieving higher SBS suppression. By generating a number of different tones, and by controlling phase and amplitude properly of each tone, may enable generation of square, flat-top spectrums. The out of band spectrum components do not contribute to SBS suppression but also do not contribute to the broad spectrum which may increase modulation response roll-off.

Roll-off occurs because fiber has dispersion, such that at each individual spectrum the spectral component traveling time is different at the end. When high frequency components are combined, modulation response roll-off occurs because of larger phase difference. Widening the spectrum is not a simple solution since there are many applications, such as WDM, where the wide spectrums may cause overlaps/cross-talk between channels.

In embodiments, multiple SBS suppression tones are used to phase modulate the light, where SBS threshold of 16-17 dBm can be achieved. However, such phase modulation may need an additional phase modulator that adds to the cost of transmitter significantly and in some case, a phase modulator is not feasible solution for some technologies, such as electro-absorption modulators. Direct laser dithering, on the other hand, does not allow the spectrum symmetry and therefore cannot result in a flat-top rectangular spectrum spread capable of achieving a desired SBS suppression.

In this disclosure, a method is proposed that allows two-tone directly laser dithering to achieve both high SBS suppression and a confined flat-top optical spectrum spread. In one or more embodiments, IM modulation is eliminated while keeping the FM modulation, which thereby provides a path to achieving the targeted SBS suppression and spectrum spread.

Figure 4:
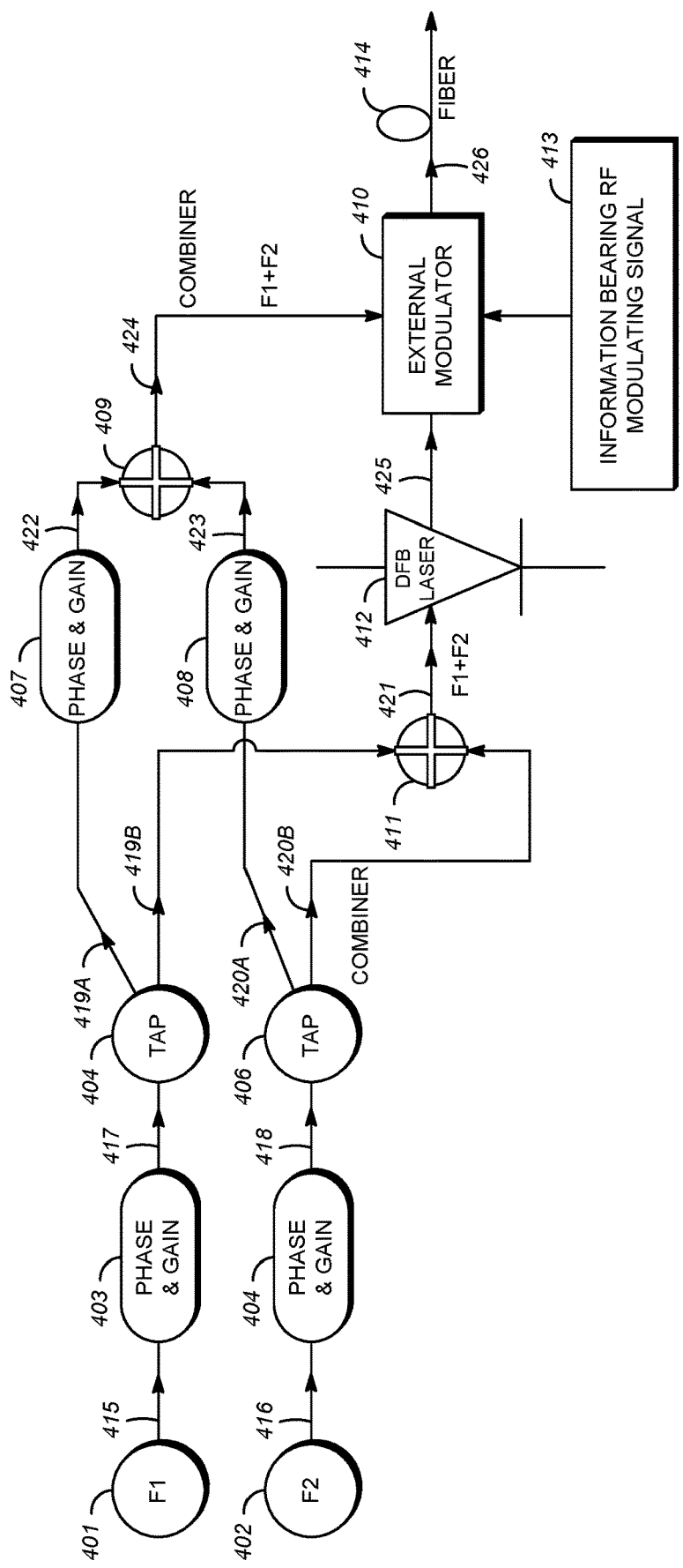
FIG. 4 depicts an example two-tone SBS suppression circuit with canceled IM in accordance with the disclosed techniques.

FIG. 4 illustrates an embodiment of the disclosed techniques of a two-tone SBS suppression, where the circuit includes an operation to cancel IM. The diagram in FIG. 4 depicts a modulator portion of an optical transmitter having a DFB laser 412 and an external modulator 410, similar to that shown in FIG. 2. Thus, similar to the circuit portion shown in FIG. 2, FIG. 4's depiction of the modulator portion of the optical transmitter likewise includes an SBS suppression dither and dither signal generation circuit and an IM signal cancellation circuit, with IM signal cancellation added.

As further shown in FIG. 4, there are two frequency generators 401, 402 that each generate a dither signal 415, 416 at frequency of f1 and f2, respectively. The two dither signals 415, 416 are sent to a respective first set of gain and phase adjustment circuits, 403, 404, respectively, for gain and phase tuning. Then, at 405 and 406, respectively, each dither signal that has been gain and phase adjusted individually 417, 418, is then split at the output of the first set of gain and phase control circuits 405, 406. For example, the first dither signal is generated at 401, adjusted at 403, and split at 405 into a first portion 419a and a second portion 491b. The second dither signal generated at 402, adjusted at 404, is split into a first portion 420a and a second portion 420b. A portion of the split signals are combined. For example, the second portions 419b and 420b of the first and second dither signal may be combined by a combiner 411 into signal 421 (f1+f2). The combined signal 421 is sent to the laser source 412 for direct SBS suppression dithering, shown outputting as signal 425.

The other portions of the split dither signals, first portions 419a and 420a, are individually sent to respective second gain and phase adjustment circuits, 407 and 408, respectively. The output of the adjusted signal portions 422, 423 from the second gain and phase adjustment circuits 407 and 408 are then combined at combiner 409 into signal 424 (f1+f2). The combined signal 424 is sent to the external modulator 410 for IM cancellation. The second set of gain and phase adjustment circuits 407 and 408 may adjust the dithering signal 424 such that it is out of phase with dithering signal 425 at the external generator 410. For example, the second set of gain and phase adjustment circuits may adjust the phase and gain of first portions 419a and 420a such that the combined signal 424 is 180 degrees out of phase from signal 421 that dithers the laser 412. However, both signals 421 and 424 may differ from the amplitude that dithers the laser directly because the modulation efficiency may be different. The OMI may not be the same especially when the chirp efficiency at two different dither frequencies are different or to make the flat top the modulation index at each frequency may be tuned differently.

As described in additional detail below, the disclosed techniques for transmitting an optical signal through optical fiber may result in an improved stimulated Brillouin scattering (SBS) suppression, which is similar to the SBS suppression achieved with use of an optical phase modulator, but with generating a flat-top rectangular spectrum spread. Further, different from the optical phase modulator method, the disclosed techniques do not require phase modulator to achieve a similar SBS suppression using optical frequency modulation. As illustrated below, if certain phase and amplitude conditions are not met, the flat-top spectrum may not be achieved. By controlling both signal generators to maintain a proper relationship, a flat-top spectrum may be achieved. Thus, the dithering at each tone to reduce the individual tone is accomplished, as well as gain and phase adjusted before and after splitting each dithering signal to control cancellation separately. After the split, the phase/gain is also controlled separately, first adjustment is to control both signals to maintain amplitude and relative phase so the signal input to the modulator meets proper conditions. Two dithered high frequency tones have a much different effect than creating a single tone and splitting it.

In one or more embodiments, optimizing SBS suppression is accomplished by introducing a feed to the external modulator 410 with laser dither tones that are the tones that result after gain and phase adjustments. Thus, for example, the dithered light 425 and laser dither tone 424 after the gain and phase adjustments may feed the external modulator 410 in such a way that the IM modulation due to dithering at the light source 412 can be cancelled. For example, if positive and negative modulations are put on the light, they may then be cancelled if the amplitude and phase are set accordingly for cancellation. The dither signal 424 going to the external modulator may be both phase and amplitude controlled to achieve a cancellation of the IM modulation. For example, when the OMIs are the identical and phases are 180-degree out of phase, cancellation may be achieved.

With a significant reduction or cancellation of IM modulation by the phase and amplitude adjustments, the symmetry of the optical spectrum is achievable, thereby improving SBS suppression. In other words, laser dithering accompanied by both IM an FM will have an asymmetric spectrum. An FM only spectrum is symmetrical, and if IM is suppressed leaving FM, a symmetrical spectrum is achievable. Thus, recovering a symmetrical version of an optical spectrum may include removing the highest peaks and recovering the smaller peaks, which may include adjusting the signals so they are at their original FM amplitude. As shown herein, adding another input (dither tone generator) to feed the external modulator may accomplish these goals.

FIG. 4 depicts an embodiment for an optical transmitter 400 configured for optimizing SBS suppression using the disclosed techniques. As a result of the configuration in FIG. 4, the SBS suppression may be both increased and optimized. The mathematical support for the above described techniques using two tones is described below.

The mathematical explanation of IM cancellation is given as follows:

The electrical field of the light source dithered with two tones are express as $$E = [P_0(1 + m_{d1}(\omega_{d1}t) + m_{d2}\cos(\omega_{d2}t + \phi))]^{0.5} \exp[j\omega_0 t + m_{fm1}\sin(\omega_{d1}t) + m_{fm2}\sin(\omega_{d2}t + \phi)] \quad (12)$$

Where $m_{d1}$ and $m_{d2}$ are intensity optical modulation index (OMI) of the two dithering tones; $\omega_{d1}$ and $\omega_{d2}$ are angular frequency of the two dithering tones; $\phi$ is the phase difference of second dither tone relative to the first one; $m_{fm1}$ and $m_{fm2}$ are the FM modulation index of the two dithering tones.

When the two cancellation signals (the signal with negative OMI) are combined into signal 424 and added to the modulator 410, the optical light field can be expressed as $$E = [P_0(1 + m_{d1}\cos(\omega_{d1}t) + m_{d2}\cos(\omega_{d2}t + \phi))]^{0.5} \quad (13)$$
$$(1 - m_{d1}\cos(\omega_{d1}t) - m_{d2}\cos(\omega_{d2}t + \phi))]^{0.5}$$
$$\exp[j\omega_0 t + m_{fm1}\sin(\omega_{d1}t) + m_{fm2}\sin(\omega_{d2}t + \phi)]$$
$$= [P_0(1 - m_{d1}^2\cos^2(\omega_{d1}t) - m_{d2}^2\cos^2(\omega_{d2}t + \phi) -$$
$$2m_{d1}m_{d2}\cos(\omega_{d1}t)\cos(\omega_{d2}t + \phi))]^{0.5}$$
$$\exp[j\omega_0 t + m_{fm1}\sin(\omega_{d1}t) + m_{fm2}\sin(\omega_{d2}t + \phi)]$$
$$= [P_0(1 - 1/2m_{d1}^2(1 + \cos(2\omega_{d1}t) - 1/2m_{d2}^2$$
$$(1 + \cos(2\omega_{d2}t + 2\phi) - m_{d1}m_{d2}(\sin(\omega_{d1}t + \omega_{d2}t + \phi) +$$
$$\cos(\omega_{d2}t - \omega_{d1}t + \phi))]^{0.5}$$
$$\exp[j\omega_0 t + m_{fm1}\sin(\omega_{d1}t) + m_{fm2}\sin(\omega_{d2}t + \phi)]$$

If $m_{d1}$ and $m_{d2}$ are small, then the impact from the terms associated with $m_{d1}^2$, $m_{d2}^2$ and $m_{d1}m_{d2}$ on the optical spectrum can be very small. For a transmitter of an external modulator, the laser bias is usually very high which generates a large chirp for the same IM optical modulation index. That means for an external modulator, the spectrum and be widely spread while the IM modulation index can be still small enough for the terms associated with $m_{d1}^2$, $m_{d2}^2$ and $m_{d1}m_{d2}$ to be ignored. Besides, it is desirable to get a laser of large chirp for the same reason.

Assuming that the IM impact can be ignored after cancellation, a frequency modulation scenario and a modulation condition are desirable such that a rectangle spectrum can be produced. To simplify the analysis, the focus is now made on the FM modulation, where the above equation can be simplified as $$E = P_0^{0.5}\exp[j\omega_0 t + m_{fm1}\sin(\omega_{d1}t) + m_{fm2}\sin(\omega_{d2}t + \phi)] \quad (14)$$
$$= P_0^{0.5}e^{j\omega_0 t}\sum_{k=-\infty}^{\infty}\sum_{n=-\infty}^{\infty} J_k(m_{fm1})J_n(m_{fm2})e^{jk\omega_{d1}t}e^{jn\omega_{d2}t}e^{jn\phi}$$
$$= P_0^{0.5}e^{j\omega_0 t}\sum_{k=-\infty}^{\infty}\sum_{n=-\infty}^{\infty} J_k(m_{fm1})J_n(m_{fm2})e^{j(k\omega_{d1}+n\omega_{d2})t}e^{jn\phi}$$

Where $J_k$ and $J_n$ are Bessel function of order k and n.

New frequencies at $k\omega_{d1}+n\omega_{d2}$ are generated ($k=-\infty\sim\infty$, $n=-\infty\sim\infty$). In one or more embodiments, in order for beat frequencies to still satisfy the condition of two times of signal bandwidth, where the frequency beat terms are at $k\omega_{d1}+n\omega_{d2}$ the relationship between the dither frequencies should satisfy $\omega_{d2}=l\omega_{d1}$ ($l=2, 34 \ldots$). If $\omega_{d2}=3\omega_{d1}$ then the above equation can be expressed as $$E = P_0^{0.5}e^{j\omega_0 t}\sum_{k=-\infty}^{\infty}\sum_{n=-\infty}^{\infty} J_k(m_{fm1})J_n(m_{fm2})e^{j(k\omega_{d1}+n\omega_{d2})t}e^{jn\phi} \quad (15)$$

-continued
$$= P_0^{0.5}e^{j\omega_0 t}\sum_{k=-\infty}^{\infty}\sum_{n=-\infty}^{\infty} J_k(m_{fm1})J_n(m_{fm2})e^{j(k+3n)\omega_{d1}t}e^{jn\phi}$$
$$= P_0^{0.5}e^{j\omega_0 t}\sum_{m=-\infty}^{\infty}\sum_{n=-\infty}^{\infty} J_{3n-m}(m_{fm1})J_n(m_{fm2})e^{jm\omega_{d1}t}e^{jn\phi}$$

The amplitude at each frequency is determined by $$\sum_{n=-\infty}^{\infty} J_{3n-m}(m_{fm1})J_n(m_{fm2})e^{jn\phi},$$

where m=j+3n. It is seen that phase $\phi$ in such instances also affects the amplitude.

Figure 5:
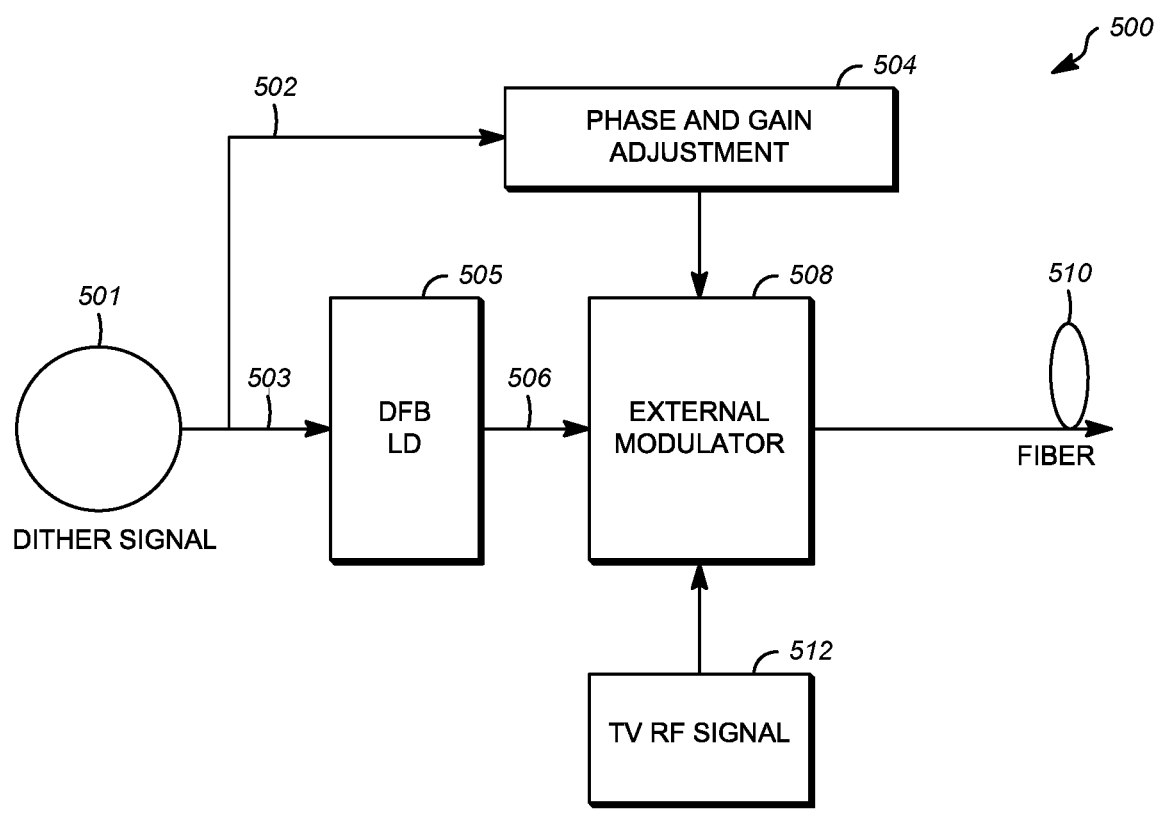
FIG. 5 depicts an example single-tone SBS suppression circuit with cancelled IM in accordance with the disclosed techniques.
Figure 6:
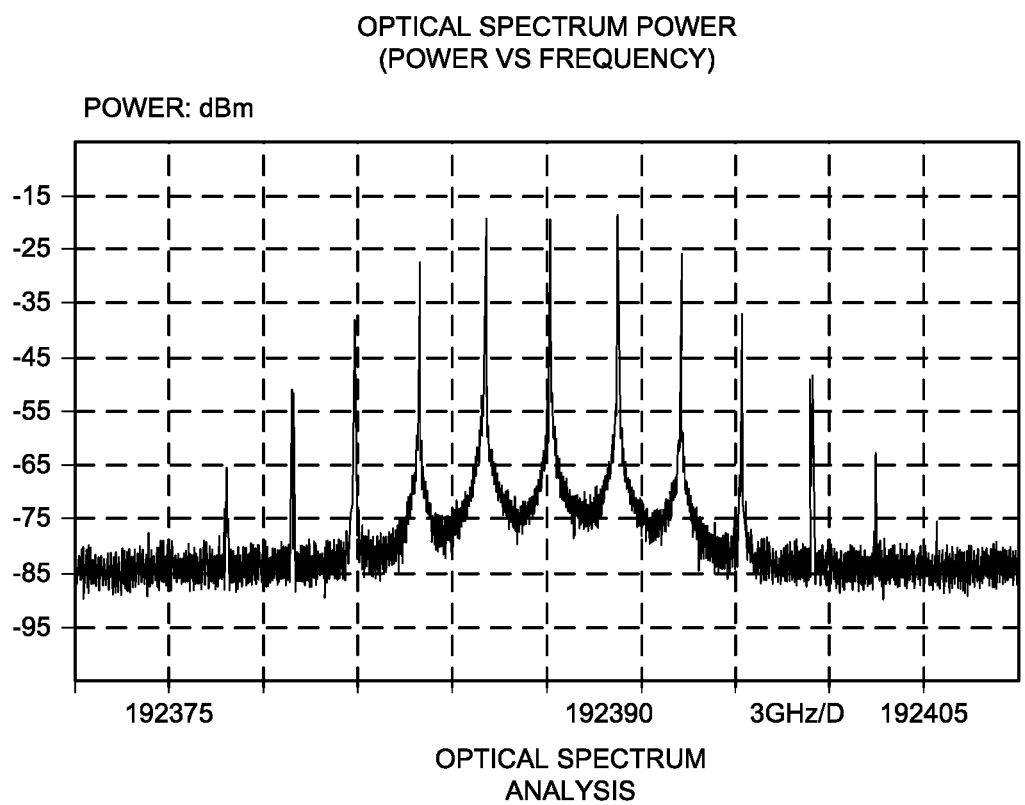
FIG. 6 is an example of the optical spectrum after dither IM is cancelled from the spectrum. A symmetrical spectrum is achieved.

FIG. 5 illustrates an example of a single tone SBS suppression circuit with canceled IM, in contrast to the two-tone SBS suppression circuit depicted in FIG. 4. To demonstrate effectiveness of IM cancellation, a comparison is made to single tone dithering, such as that accomplished in FIG. 2. Further depicted in FIG. 5 is use of only one second gain and phase adjustment circuit 504 (similar to the gain and phase adjustments of 407 and 408 shown in FIG. 4) added to the single tone dithering circuit for the single tone generator. As distinguished from the two tone case where the first adjustment adjusts a two tone relationship for achieving a flat top spectrum, the second adjustment geared toward cancellation, the first adjustment may therefore be removed in the single tone case. The gain to the laser can be controlled at the output of the dither signal generator 501. The RF combiners from the two tone circuit are not included in the circuit for the single tone generator, since the portions from multiple dither signals are not combined. In the single tone dithering case using the circuit in FIG. 5, assuming a frequency $f_1=2$ GHz is used, the output spectrum analysis for the single tone dither is illustrated in FIG. 6 FIG. 6 is an example of the optical spectrum after dither IM is cancelled from the spectrum using the circuit depicted in FIG. 5. As illustrated in FIG. 6, a symmetrical spectrum is achievable as a result of IM cancellation. Thus, FIG. 6 illustrates the IM cancelled spectrum of the same dithered laser shown in FIGS. 2 and 3. As described above, FIG. 3 show the spectrum without cancellation while FIG. 6 show the spectrum with cancellation.

As illustrated by the comparison, the optical spectrum in FIG. 6 becomes symmetrical from the asymmetrical spectrum depicted in FIG. 3, with promoted and demoted spectral components being set back to the level that frequency modulation produces. It is noted that when the input to the spectrum analyzer is attenuated, the depicted power in FIG. 6 is relative instead of absolute but the symmetrical spectrum is still demonstrated. Comparing the two spectrums in FIGS. 3 and 6, it is clear that SBS threshold is improved by more than 1 dB in FIG. 6 A flat-top spectrum is thus achieved, although not necessarily rectangle in shape.

If three major frequency spectral components in FIG. 5 are counted to define the SBS suppression, the SBS threshold is 10*log(3)+6 dBm=10.8 dBm. No spectral component is higher than the other. However, where 3 tones=5 dB, the measured SBS threshold is 12 dBm. For example, with an SBS threshold of 6 dBm, 5+6=11 dBm. Small spectral components together with the three major frequency spectral components increases the SBS threshold closer to 12 dBm. This is because the other spectral components are not small enough to be ignored. Some more experiments were conducted to further increase the SBS threshold using single dither tone but not significant improvement was achieved because of a larger asymmetry in the spectrum. The wide spread of the spectrum could also generate some undesirable performance degradation as mention above.

As disclosed herein, further improvement of SBS suppression may be achieved using multiple dithering tones as commonly done with an optical phase modulator. Different from phase modulation, chirp induced spectrum widening is caused by FM modulation. It is therefore important to demonstrate the possibility of generating the confined flat-top rectangular spectrum spread. If the IM modulation impact can be ignored after IM cancellation is implemented, the mathematical expression of two dither tones with FM modulation only can be re-written as follow:

$$E = [P_0(1 + m_{d1}\cos(\omega_{d1}t) + m_{d2}\cos(\omega_{d2}t+\phi))]^{0.5} \exp[j\omega_0 t + m_{fm1}\sin(\omega_{d1}t) + m_{fm2}\sin(\omega_{d2}t+\phi)] \quad (16)$$

Figure 7:
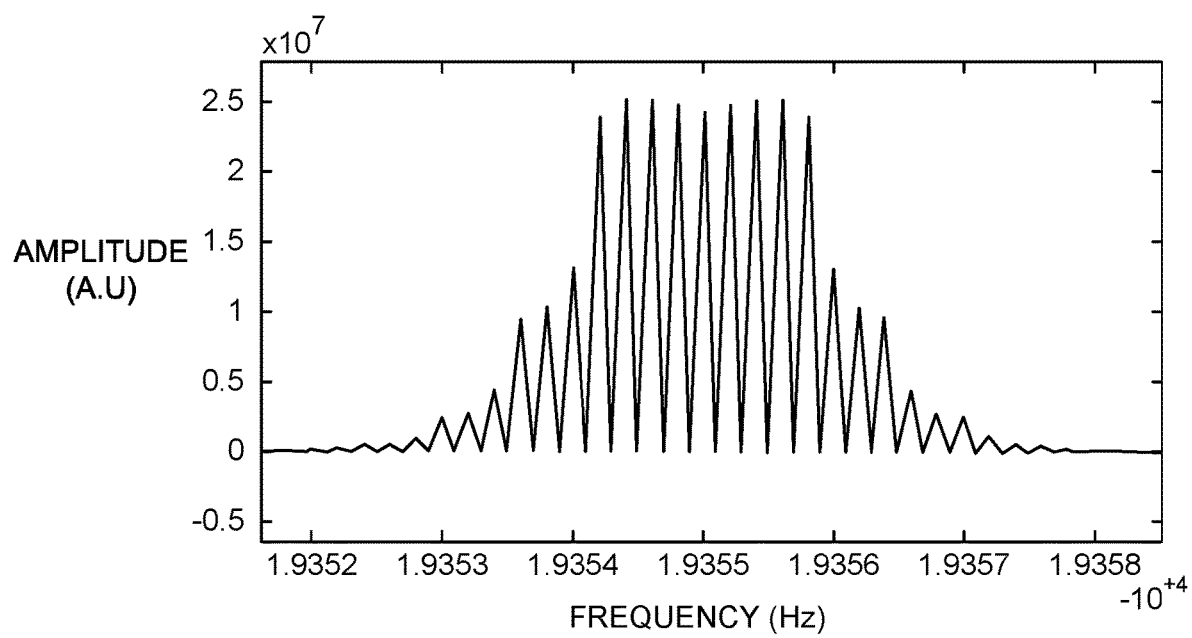
FIG. 7 is an example of calculated 9-component flat top optical spectrum generated by IM cancelled two-tone dithering SBS suppression.

Equ. (16) is very complicated as shown in expanded form of equ. (15) and therefore a numerical method is used to calculate the optical spectrum. Assuming $f_1 = 2$ GHz and $f_1 = 6$ GHz, a flat top two-tone dithered optical spectrum due to FM only may be achieved which is demonstrated in FIG. 7. As illustrated by this example in FIG. 7, a rectangular 9-line spectrum is produced and therefore 15 dBm SBS threshold can be achieved with a confined spectrum spread. In other words, using the multiple tone dithering techniques described herein, a flat-top spectrum, that may be rectangular, may result, and a SBS threshold with a confined spectrum spread may be achieved.

Referring back to FIG. 4, there are two separate dither tone generators of frequency f1 and f2 401, 402, each feeding its own independent gain and phase control circuit 403, 404. As described above, the outputs of the two gain and phase control circuits are tapped off partially at 405 and 406, and then combined at combiner 411 and sent to laser diode 412 for dithering modulation. A tapped portion of the dither tones 419a and 420a are sent to a second set of respective gain and phase control circuits 407, 408 and then sent to the combiner 409 and external modulator 410 for IM cancellation.

The first set of gain and phase control circuits 403, 404 may be used to achieve a flat top FM spectrum. The second set of gain and phase control circuits 407, 408 may be used to meet IM cancellation conditions.

For example, when IM is cancelled by the circuit in FIG. 4, the optical spectrum will turn out to be symmetrical around it original optical carrier frequency. In one or more embodiments, first a symmetrical spectrum is achieved, then the flat-top is tuned. Chirp may vary from laser to laser, so the application of the disclosed concepts may be adjusted for effectiveness. Once approximate values for adjustments are determined, the values can be used a guideline for IM cancellation adjustment. In one or more embodiments, a phase condition for the cancellation signals needs to be set to $(2n+1)\pi$ out of phase of the original signals. There are many ways to meet this out of phase condition. For example, if $w_2 = 3w_1$ is still assumed, one transmission line that generates $\pi$ phase change for $w_1$ can also meet the phase condition of $3\pi$. The gain of each path in the second set of gain and phase circuits can also be tuned to achieve the amplitude requirement of each frequency for IM cancellation separately.

Once the phase and gain conditions of the IM cancellation are established at the second set of gain and phase adjustment circuits 407, 408 and the symmetrical optical spectrum is obtained by the modulator 410, the gain and phase conditions of the first set of gain and phase circuits 403, 404 may be adjusted to achieve a flat top optical frequency spectrum.

Figure 8:
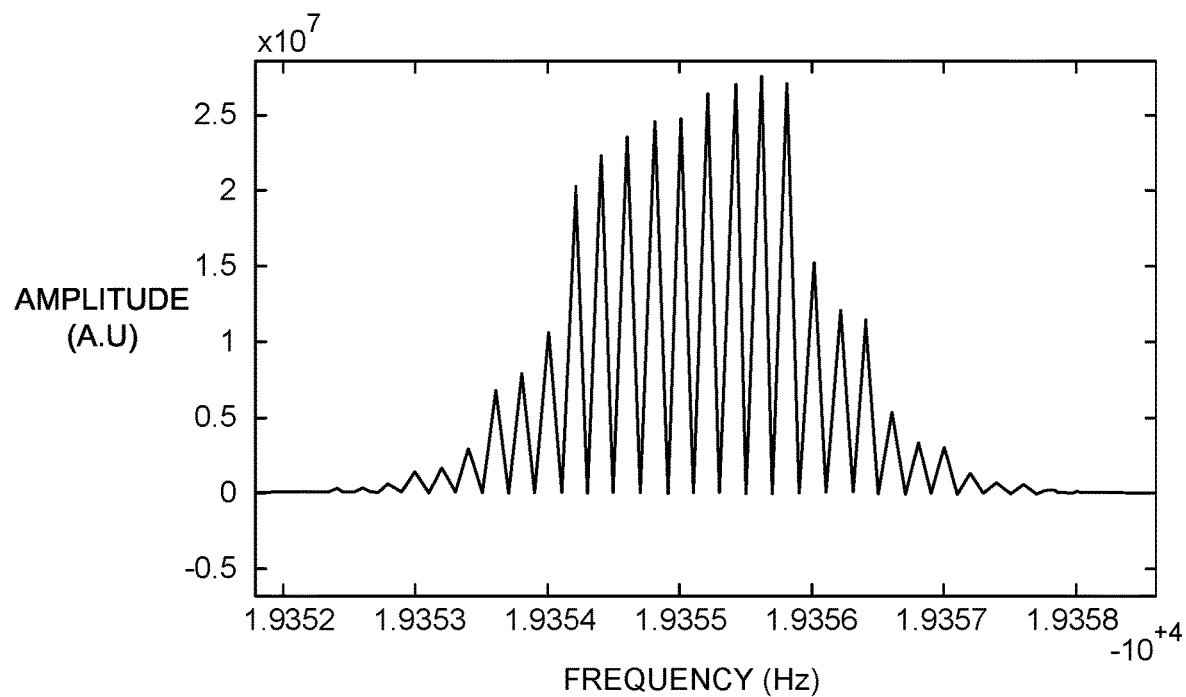
FIG. 8 depicts an asymmetrical optical spectrum due to the combined IM and FM.
Figure 9:
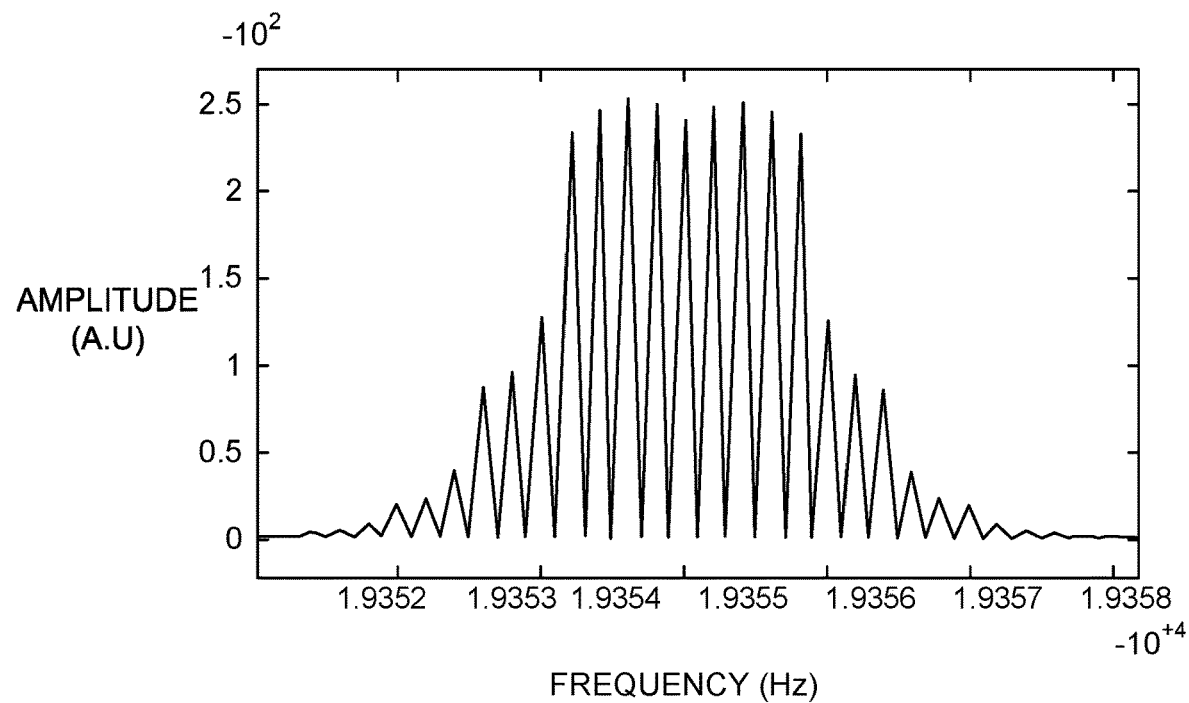
FIG. 9 depicts a recovered flat top symmetrical optical spectrum.

FIG. 8 illustrates an asymmetrical optical spectrum due to a combined IM and FM. FIG. 9 illustrates a recovered flat top symmetrical optical spectrum using the multiple tone dithering techniques disclosed herein, such as achievable by the embodiment of the circuit shown in FIG. 4. Thus, in contrast to FIG. 7, which illustrates a pure FM spectrum, FIG. 9 is achieved with a cancelled IM as disclosed herein.

FIG. 8 shows a combined intensity and frequency modulation optical spectrum, where the significant asymmetry can be clearly seen and therefore the SBS suppression is not well achieved. FIG. 9, on the other hand, is the optical spectrum that results from circuitry such as that shown in FIG. 4, with the same laser dithering but cancelled intensity modulation. As shown in FIG. 9 spectrum becomes symmetrical and flat again and therefore the SBS is well suppressed as targeted.

It should be pointed out that the dither signals can be of sinusoidal form or any other signal forms. The dither signals can also be conditioned, for example, frequency modulated by modulating VCO bias voltage of the dither signal generator. The above examples only serves a purpose of demonstration, but should not be limited to the forms in the examples.

It should also be noted that in one or more embodiments, it may be desirable that the amplitude and phase conditions, once established, be maintained to keep them the way they are established. For example, an automatic gain control (AGC) circuit may be used in the phase and amplitude adjustment circuits, which is a closed-loop feedback regulating circuit designed to provide a controlled signal amplitude at its output despite any variations of the amplitude of the input signal.

In addition to the significant SBS suppression improvement, cancelling the IM dithering modulations as disclosed herein can also reduce beat noise that is caused by the beat between IM modulation tones and out of band distortion frequency components.

In one or more embodiments, the two high frequency dithering signals are at least twice a highest frequency of the RF information-carrying signal received. In one or more embodiments, the two dither frequencies satisfy $\omega_{d2} = l\omega_{d1}$ (l=2, 34 ... ). In one or more embodiments, a portion, after split, of the high frequency dithering signals 421 are used to modulate the light source to spread the optical power of the light beam in a wider optical spectral range, thereby suppressing SBS, and the other portion of the dithering signals 424 are used to modulate light at the external modulator to cancel the intensity modulation due to the dither signals 421. As described above, the gain and phase of the first and second gain and phase adjustment circuits may be tuned to achieve both flat top rectangle spectrum shape and IM cancellation separately.

Figure 10:
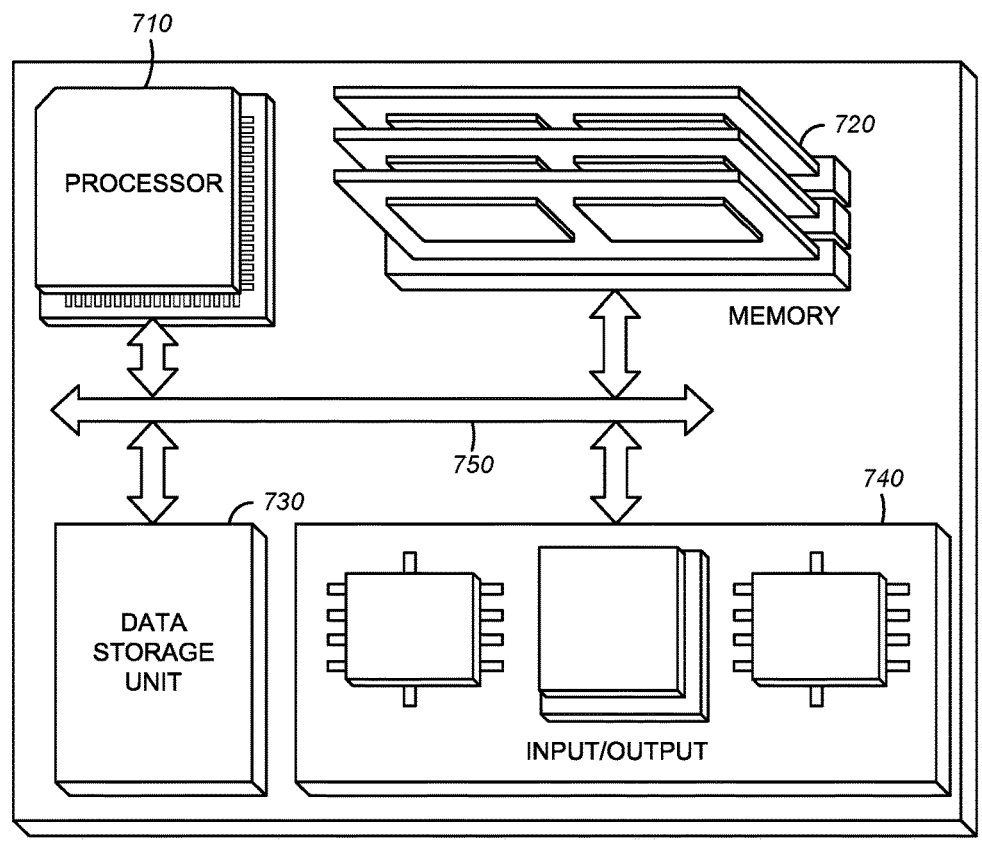
FIG. 10 is a block diagram of a hardware configuration operable to perform the functions disclosed herein.

FIG. 10 is a block diagram of a hardware configuration operable to perform the functions disclosed herein. The hardware configuration may define a data source or computing device, such as a general hardware platform server configured to receive and transmit information over a network.

The hardware configuration can include a processor 10, a memory 20, a storage device 30, and an input/output device 40. Each of the components 10, 20, 30, and 40 can, for example, be interconnected using a system bus 50.

The processor 10 can be capable of processing instructions for execution within the hardware configuration. In one implementation, the processor 10 can be a single-threaded processor. In another implementation, the processor 10 can be a multi-threaded processor. The processor 10 can be capable of processing instructions stored in the memory 20 or on the storage device 30. In embodiments where the processor 10 includes two or more processors, the processors may operate in a parallel or distributed manner. The processor 10 may execute an operating system of memory 20 or software associated with other elements of memory 20.

The memory 20 can store information within the hardware configuration. In embodiments, the memory 20 can be a computer-readable medium. In embodiments, the memory 20 can be a volatile memory unit. In embodiments, the memory 20 can be a non-volatile memory unit. In embodiments, the storage device 30 can be capable of providing mass storage for the hardware configuration. In embodiments, the storage device 30 can be a computer-readable medium. In various embodiments, the storage device 30 can, for example, include a hard disk device, an optical disk device, flash memory or some other large capacity storage device. In other embodiments, the storage device 30 can be a device external to the hardware configuration.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, and DSL are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The input/output device 40 provides input/output operations for the hardware configuration. In embodiments, the input/output device 40 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for providing video, data, and/or voice services to a client device and/or a customer premise equipment device. In embodiments, the input/output device 40 can include driver devices configured to send communications to, and receive communications from one or more networks. The input/output device 40 may function as a communication device that allows device to communicate with another device over a network. Communication device 40 may include one or more wireless transceivers for performing wireless communication and/or one or more communication ports for performing wired communication.

Figure 11:
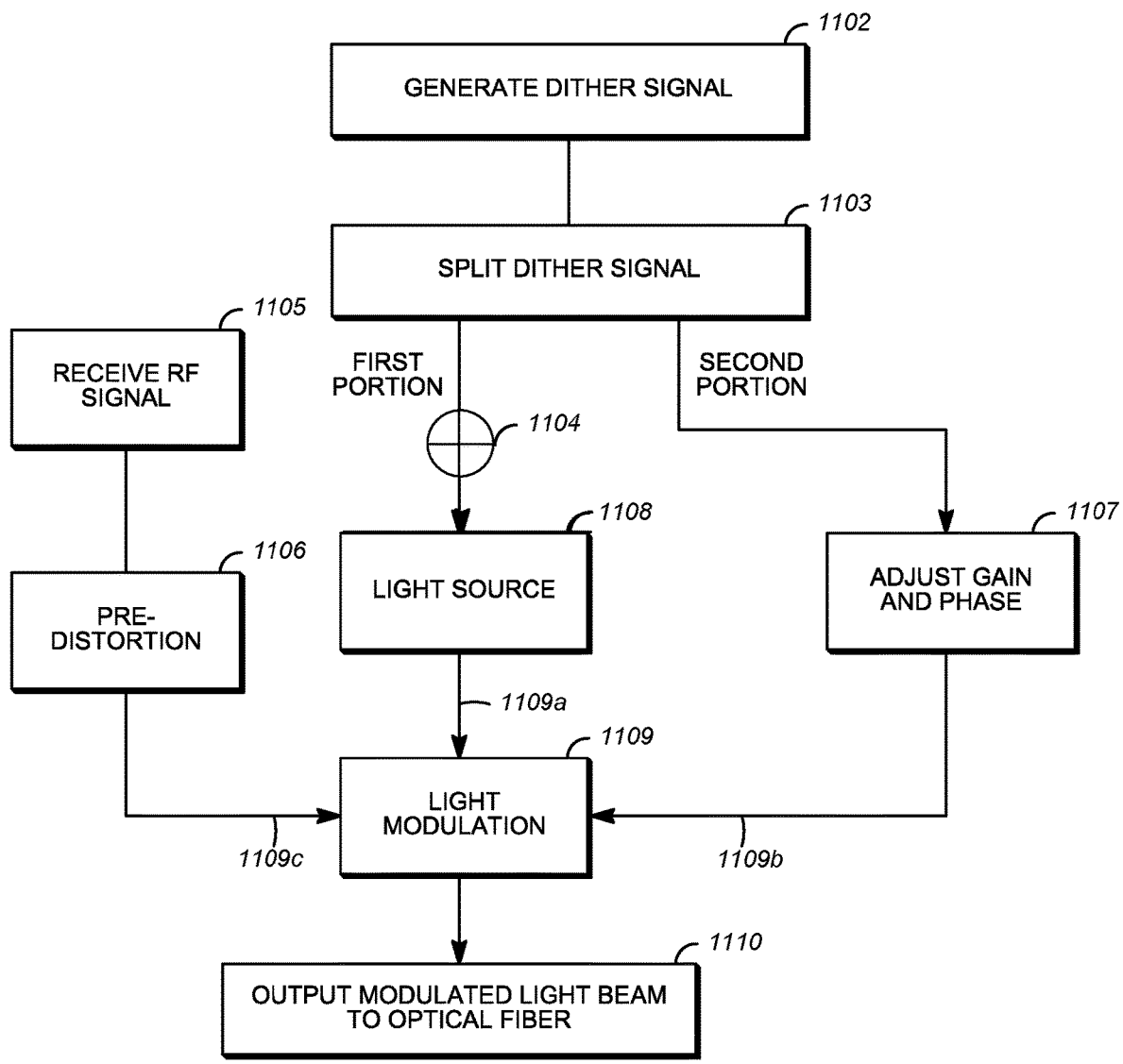
FIG. 11 depicts a flow diagram as an example of the method disclosed herein for suppressing SBS and reducing noise caused by SBS suppression techniques.

In embodiments, a computer-readable storage medium has stored thereon instructions that, when executed, cause any of the functions described herein, including the method depicted in FIG. 11. Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. For example, the signal generator, splitter, light source, phase and gain control circuit, external modulator, and the like described herein, may be capable of executing instructions or being controlled by instructions executed by a processor. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

While this specification contains many specific implementation details, these should not be construed as limitations on the scope of any invention or of what may be claimed unless otherwise specified, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

FIG. 11 depicts a flow diagram as an example of the method disclosed herein for suppressing SBS and reducing noise caused by SBS suppression techniques. The method allows improved SBS suppression using the direct dithering method with the use of two or more dithering signals.

At 1101, multiple high frequency signals may be generated for dithering, such that a resulting dither signal can be used to modulate a light source. One or more of the multiple high frequency signals may be dithered by other lower frequency tone(s). The high frequency is referred to herein as the higher frequency of the dithered signal relative to the frequency of the signal (the information bearing modulation signal). In one or more embodiments, this high frequency is at least two times the highest signal frequency.

At 1103, two or more of the multiple dither signals may be split into at least two portions, a first portion of the respective dithered higher frequency signals, collectively combined for directly modulating a light source, and a second portion of the respective dithered higher frequency signal, individually adjusted by a respective phase and gain adjustment circuit before combination at 1111

The light source may be both dithered at 1108 and canceled at the modulation at 1109. The light source 1104 generates the light, whereas the modulator at 1109 adds the cancellation signal on to the light. Dithering occurs at 1108, the modulation and cancellation occurs at 1109.

As described in more detail herein, embodiments are disclosed in which a light beam emitted from a light source may be modulated at 1109 by multiple signals. The light source may be a laser, such as a laser diode, for example. The light source may emit the light beam while the light source is directly modulated with the first portions of the dithered higher frequency signals combined. At 1104, the first portions of the dithered higher frequency signals, combined, modulates the light source.

The second portions of the dithered higher frequency signals may each be adjusted at 1107 such that the gain and/or phase of the second portions of the dithered higher frequency signals can cancel or reduce intensity modulation at the modulator caused by the modulation of the light source by the first portions of the dithered higher frequency signals. In one or more embodiments, the phase of the combined second portions of the dithered higher frequency signals may be adjusted to be 180 degree out of phase with the combined first portions of the dithered higher frequency signal. The gain of each second portion of the dithered higher frequency signals may be adjusted such that in combination the combined signal defines a signal amplitude that cancels the intensity modulation caused by the direct modulation of the light source by the first portions of the dithered higher frequency signal.

The light source may be modulated by the adjusted second portions of the dithered higher frequency signal at 1109b. Thus, the light beam emitted from the light source may be externally intensity modulated by both the adjusted second portions of the dithered higher frequency signals and with a radio frequency (RF) information carrying signal.

After being emitted by the light source, which may be dithered by dithering signal(s), the light beam may be further intensity modulated externally with an RF information-carrying signal at 1109c. The light beam which is intensity-modulated with the RF information-carrying signal at 1109c may be thereafter coupled into optical fiber at 1110.

In embodiments, the high frequency dithering signals generated at 1101 are at least twice a highest frequency of the RF information-carrying signal received at 1105. The pre-distortion that may occur at 1106 is between the receipt of the RF signal and the modulator, where pre-distortion may generate an opposing distortion to cancel distortion generated by the modulation at 1109. In embodiments, the high frequency dithering signals generated at 1101 and used to modulate the light source at 1108 spreads the optical power of the light beam in a wider optical spectral range, thereby suppressing SBS.

I claim:

1. A method for stimulated Brillouin scattering suppression in an optical transmission system, the method comprising:
    generating two or more high-frequency dithering signals, each having a frequency at least twice that of a highest information-bearing modulation frequency, where a frequency of a first one of the high-frequency dithering signals is multiple times higher than a frequency of a second one of the high frequency dithering signals, and where the high-frequency dithering signals are created using a low-frequency signal generated by modulating a bias voltage of at least one voltage-controlled oscillator (VCO) used to generate the high-frequency signals; adjusting the gain and phase of each of the two or more dithering signals at a first set of gain and phase control circuits;
    splitting each of the two or more adjusted dithering signals at an output of the first set of gain and phase adjustment circuits, each of the two or more adjusted dithering signals split into at least a first portion and a second portion;
    directly modulating a light source with combined first portions of the split high-frequency signals;
    adjusting each of the second portions of the high-frequency signals by a second set of phase and gain adjustment circuit;
    emitting a light beam from the light source while directly modulating said light source with the combined first portions of the high-frequency signals; externally intensity modulating the light beam emitted from the light source with both gain and phase adjusted second portions of the high-frequency signals and with a radio frequency (RF) information-bearing signal; and
    coupling onto an optical fiber the light beam modulated with the RF information-carrying signal.

2. The method of claim 1, wherein a gain or a phase of the second portion of the high-frequency signals are adjusted to cancel an intensity modulation caused by modulation of the light beam by the first portion of the high-frequency dithering high frequency signals.

3. The method according to claim 2, wherein the phase of the second portion of the higher-frequency signals are adjusted to be 180 degree out of phase with the high frequency signals modulating the laser source.

4. The method according to claim 2, wherein the gain of the second portion of the high-frequency signals are adjusted to set a signal amplitude of the second portion to cancel the intensity modulation caused by the direct modulation of the light source by the first portion of the high-frequency signals.

5. The method according to claim 1, further comprising modulating a laser bias current of the light source to cause a high-frequency intensity modulation of the light beam, wherein the light source is a laser.

6. The method according to claim 1, wherein the wave form modulating the bias voltages can have one of a sinusoidal waveform, a square waveform, or a triangular waveform.

7. The method according to claim 1, wherein an electronic coupler circuit splits the high-frequency signals.

8. The method according to claim 1, wherein a phase of the second portion of the high-frequency signals are adjusted by an electronic delay line.

9. The method according to claim 1, wherein a gain of the second portion of the signals are adjusted by at least one of an electronic attenuator or an amplifier.

10. The method according to claim 1, wherein an output signal from second set of a phase and gain control circuits, to which the second portion of the high-frequency signals are input, are combined and applied to an external modulator to modulate the light beam.

11. The method according to claim 1, wherein an output signal from second set of phase and gain control circuits, to which the second portion of the high-frequency signals are input, are combined and applied to an RF pre-distortion circuit and then to an external modulator to modulate the light.

12. The method according to claim 11, wherein reducing the intensity modulation caused by the high-frequency dithering signals enable recovery of a symmetry of an optical spectrum of the modulated light beam.

13. The method according to claim 11, further comprising simultaneously canceling or reducing noise due to a beat between a dither tone and out-of-band distortion beat spectrum.

14. The method according to claim 11, wherein both the RF information carrying signal and the adjusted second portion of the dithered high-frequency signal are provided to a pre-distortion circuit before used to modulate the light beam.

15. A method for cost effective stimulated Brillouin scattering suppression in an optical transmission system, the method comprising:
generating two or more high-frequency dithering signals with their frequency at least twice the highest information-bearing modulation frequency, where the frequency of a highest-frequency dithering signal is multiple times the frequency of a lowest-frequency dithering signal, and where the high-frequency dithering signals are created using a low-frequency signal generated by modulating a bias voltage of at least one voltage-controlled oscillator (VCO) used to generate the high-frequency signals;
adjusting the gain and phase of the dithering signals at the first set of gain and phase control circuits;
splitting the dithered high frequency dithering signals at the output of the first set of gain and phase adjustment circuits;
directly modulating a light source with a first portion of the split high-frequency dithering signals;
adjusting a second portion of the high-frequency dithering signals by the second set of phase and gain adjustment circuit;
emitting a light beam from the light source while directly modulating said light source with the first portion of the high-frequency dithering signals;
externally intensity modulating the light beam emitted from the light source with both gain and phase adjusted second portion of the high-frequency dithering signals and with a radio frequency (RF) information carrying signal, coupling into the optical fiber the light beam modulated with an information-bearing RF signal.

16. The method of claim 15, wherein a gain or a phase of the second portion of the high-frequency dithering signals are adjusted to cancel an intensity modulation caused by modulation of the light beam by the first portion of the high-frequency dithering signals.

17. The method according to claim 16, wherein the phase of the second portion of the high-frequency dithering signals is adjusted to be 180-degrees out of phase with the high high-frequency dithering signals modulating the laser source.

18. The method according to claim 16, wherein the gain of the second portion of the high-frequency dithering signals are adjusted to set a signal amplitude of the second portion to cancel the intensity modulation caused by the direct modulation of the light source by the first portion of the high frequency dithered signals.

19. The method according to claim 15, further comprising modulating a laser bias current of the light source to cause a high frequency intensity-modulation of the light beam, wherein the light source is a laser.

20. The method according to claim 1, wherein the wave form modulating the bias voltages can have one of a sinusoidal waveform, a square waveform, or a triangular waveform.

21. The method according to claim 15, wherein an electronic coupler circuit splits the high-frequency dithering signals.

22. The method according to claim 15, wherein a phase of the second portion of the high-frequency dithering signals are adjusted by an electronic delay line.

23. The method according to claim 15, wherein a gain of the second portion of the signals are adjusted by at least one of an electronic attenuator or an amplifier.

24. The method according to claim 15, wherein an output signal from second set of a phase and gain control circuits, to which the second portion of the high-frequency dithering signals are input, are combined and applied to an external modulator to modulate the light beam.

25. The method according to claim 15, wherein an output signal from second set of phase and gain control circuits, to which the second portion of the high-frequency dithering signals are input, are combined and applied to an RF pre-distortion circuit and then to an external modulator to modulate the light.

26. The method according to claim 24, wherein reducing the intensity modulation caused by the high-frequency dithering signals enable recovery of a symmetry of an optical spectrum of the modulated lightbeam.

27. The method according to claim 24, further comprising simultaneously canceling or reducing noise due to a beat between a dither tone and an out-of-band distortion beat spectrum.

28. The method according to claim 24, wherein both the RF information carrying signal and the adjusted second portion of the high-frequency dithering signal are provided to a pre-distortion circuit before used to modulate the light beam.

* * * * *

UNITED STATES PATENT AND TRADEMARK OFFICE
CERTIFICATE OF CORRECTION

PATENT NO. : 10,848,243 B2
APPLICATION NO. : 16/671702
DATED : November 24, 2020
INVENTOR(S) : Jun Wang It is certified that error appears in the above-identified patent and that said Letters Patent is hereby corrected as shown below:

In the Claims

Column 20, Line 67: delete "high frequency"

Signed and Sealed this
Tenth Day of December, 2024

Katherine Kelly Vidal
*Director of the United States Patent and Trademark Office*